(12) United States Patent
Han et al.

(10) Patent No.: US 9,984,433 B2
(45) Date of Patent: May 29, 2018

(54) IMAGE FILTERING METHOD AND CT SYSTEM

(71) Applicants: Yingjie Han, Beijing (CN); Xingdong Sheng, Beijing (CN)

(72) Inventors: Yingjie Han, Beijing (CN); Xingdong Sheng, Beijing (CN)

(73) Assignee: HITACHI, LTD, Tokyo (JP)

(*) Notice: Subject to any disclaimer, the term of this patent is extended or adjusted under 35 U.S.C. 154(b) by 32 days.

(21) Appl. No.: 15/129,260

(22) PCT Filed: Mar. 26, 2015

(86) PCT No.: PCT/CN2015/075123
§ 371 (c)(1),
(2) Date: Sep. 26, 2016

(87) PCT Pub. No.: WO2015/144069
PCT Pub. Date: Oct. 1, 2015

(65) Prior Publication Data
US 2017/0109860 A1    Apr. 20, 2017

(30) Foreign Application Priority Data

Mar. 27, 2014  (CN) .......................... 2014 1 0118326

(51) Int. Cl.
*G06T 1/20* (2006.01)
*G06T 5/20* (2006.01)
(Continued)

(52) U.S. Cl.
CPC .................. *G06T 1/20* (2013.01); *G06T 5/20* (2013.01); *G06T 11/003* (2013.01); *H04N 5/32* (2013.01); *G06T 2207/10081* (2013.01)

(58) Field of Classification Search
CPC . G06T 1/20; G06T 11/003; G06T 5/20; G06T 2207/10081; H04N 5/32
See application file for complete search history.

(56) References Cited

U.S. PATENT DOCUMENTS 5,602,934 A * 2/1997 Li .......................... G01R 33/56
                                                          382/128
2005/0025382 A1* 2/2005 Oizumi ..................... G06T 5/20
                                                          382/266
(Continued)

FOREIGN PATENT DOCUMENTS

CN      101596113 A    12/2009
CN      102609978 A    7/2012
CN      103593850 A    2/2014

*Primary Examiner* — Ming Hon
(74) *Attorney, Agent, or Firm* — Miles & Stockbridge P.C.

(57) ABSTRACT

The present invention relates to an image filtering method and a CT (Computed Tomography) system. The image filtering method is configured to filter an image in a parallel manner by use of a multi-core processor, and comprises the following steps: firstly, determining a plurality of computing directions for filtering processing according to the number of the dimension of the image and the predetermined neighborhood range of filtering processing; secondly, according to each of the determined computing directions, for one row of pixels in the image, by taking each pixel in the row as an object pixel, performing by each thread in a plurality of threads predetermined filtering computing between the object pixel and the respective neighborhood pixels of the object pixel in the computing direction, saving the filtering computing results as the filtering results of the object pixels and the respective neighborhood pixels in a cumulative manner; and finally accumulating the filtering results of all the determined computing directions to obtain the image filtering result. Therefore, repeated computations in the current parallel computing can be reduced to greatly accelerate parallel computing for image filtering.

8 Claims, 8 Drawing Sheets

(51) Int. Cl.
*G06T 11/00* (2006.01)
*H04N 5/32* (2006.01)

(56) References Cited

U.S. PATENT DOCUMENTS

| | | | | |
|---|---|---|---|---|
| 2007/0014486 A1* | 1/2007 | Schiwietz | ......... | G01R 33/4824 382/276 |
| 2008/0107314 A1* | 5/2008 | Georgescu | ................ | G06T 5/20 382/128 |
| 2010/0278413 A1* | 11/2010 | Jarisch | .................. | G06T 11/006 382/131 |
| 2013/0101192 A1* | 4/2013 | Nakanishi | ............. | G06T 11/006 382/131 |
| 2013/0108128 A1* | 5/2013 | Yu | ......................... | G06T 11/006 382/131 |
| 2016/0071249 A1* | 3/2016 | Okabe | ..................... | G06T 15/08 345/427 |
| 2016/0247271 A1* | 8/2016 | Hishida | ................. | G01N 23/04 |

* cited by examiner

IMAGE FILTERING METHOD AND CT SYSTEM

TECHNICAL FIELD

The present invention relates to an image filtering method and a CT (Computed Tomography) system, in particular to an image filtering method and a CT system, each utilizing parallel computing.

BACKGROUND

Image filtering, which means eliminating useless noise in images, is an essential operation in image pre-processing. A filter is one of the key components for image processing and is quite important in image transformation, image enhancement and image restoration. Different filters may be selected to achieve different processing effects, for example, a low-pass filter may be applied for image smoothing, and a high-pass filter may be applied for edge extraction. With the development of information technology, the amount of data needing processing greatly increases, which demands higher image filtering processing speeds.

Filters may not only be directly used for image processing but also serve as regularization constraint conditions of some iterative computations. For example, computed tomography (CT) is widely applied to the medical imaging field and is a scanning method for obtaining a three-dimensional tomographic image via reconstructing the tomographic image of a tested object by use of the computer technology. In this scanning method, single-pinacoid rays penetrate the tested object, and according to the different ray absorption rates and the different ray transmission rates for the respective parts of the tested object, penetrating rays may be acquired by a computer and images may be reconstructed in three dimensions. Analytic reconstruction and iterative reconstruction are two basic methods for CT image reconstruction, wherein iterative reconstruction may greatly reduce the radiation dose under the premise of guaranteeing constant image quality and is beneficial to low-radiation-dose CT which is representative of the future development direction. In iterative reconstruction of low-radiation-dose CT images, filtering regularization computation is required for each time of iterative computation, and due to large amount of medical image data, the filtering speed directly influences the CT image reconstruction speed. Therefore, accelerating large-scale image filtering processing becomes very necessary.

On the other hand, the high-performance numeric operation capability of a multi-core processor represented by a graphics processing unit (GPU) has developed rapidly in recent years, CUDA (Computer Unified Device Architecture) formally released by NVIDIA in 2007 uses a C-like language (partial expansion on the basis of supporting current C language), so that the development is easier to master. The GPU is no longer limited to graphic processing and also can be applied to general numeric calculation, and is particularly suitable for operations with high degree of parallelism and large computation.

Therefore, in recent years, people have started to use parallel computing of the multi-core processor represented by the GPU to accelerate large-scale image filtering processing. In a traditional parallel processing method, the filtering computation of each pixel in the image serves as a basic computing element to be given to each thread to accomplish. However, this not only causes lots of repeated computations and thus unnecessarily increases for the computing amount and the computing time but also results in lots of repeated accesses of a global memory and thus unnecessarily increases for the number of times of the access and the access time. So, the technical problem of low image filtering speed exists in the prior art when parallel computing is utilized to realize image filtering processing.

SUMMARY

In order to solve the above technical problem in the prior art, the present invention aims to provide an image filtering method based on a multi-core processor, represented by a GPU, and a CT system. During realization of rapid large-scale image filtering processing by use of parallel computing, the computing amount is reduced by reduction of repeated computations in parallel computing, so that parallel computing for image filtering is greatly accelerated.

To achieve the above purpose, the present invention provides an image filtering method which filters images in a parallel manner by use of the multi-core processor. The image filtering method is characterized in that it comprises the following steps: a computing direction determination step, wherein a plurality of computing directions for said filtering processing is determined according to the number of the dimension of said image and the predetermined neighborhood range of said filtering processing; a respective directions filtering computing step, wherein the following processing is performed according to each of the determined computing directions: for one row of pixels in said image, by taking each pixel in the row as an object pixel, performing by each thread in a plurality of threads predetermined filtering computing between the object pixel and the respective neighborhood pixels of the object pixel in the computing direction, and saving the filtering computing results as the filtering results of the object pixels and the respective neighborhood pixels in a cumulative manner, wherein the neighborhood pixels are pixels located within the neighborhood range of the object pixel; and an image filtering result obtaining step, wherein the filtering results of all the determined computing directions, obtained by the respective directions filtering computing step, are accumulated according to each pixel of said image to obtain the image filtering result of said image.

According to the image filtering method provided by the present invention, during image filtering processing by use of parallel computing, repeated computations in the current parallel computing may be reduced, and the computing amount may be reduced, so that parallel computing for image filtering is greatly accelerated, and the speed and the practicability of image filtering processing are improved.

Optionally, in the respective directions filtering computing step, each of the threads performs filtering computing in a parallel manner form each other.

Here, as each of the threads performs filtering computing in a parallel manner from each other, the image filtering processing speed may be improved.

Optionally, the image filtering method provided by the present invention may also be the following: in the respective directions filtering computing step, each thread aims at one row of pixels in the image, respectively, the pixels from the first to the last of the row sequentially serve as the object pixel, said filtering computing is performed between the object pixel and the respective neighborhood pixels of the object pixel in the computing direction, and said filtering computing results are saved as the filtering results of the object pixels and the respective neighborhood pixels in a cumulative manner.

Here, during filtering computing of the respective computing directions, each thread sequentially takes the pixels from the first to the last of the row as the object pixel. Therefore, the filtering computing results can be fully utilized between the respective pixels of the row to greatly accelerate parallel computing for image filtering.

Optionally, the image filtering method provided by the present invention may also be the following: when the computing directions inclined relative to the pixel arrangement direction of said image are determined in the computing direction determination step, in the respective directions filtering computing step, during processing according to the inclined directions, the numbers of the pixels in the respective rows, computed by the respective threads, are equal.

Here, during filtering computing according to the inclined computing directions, the respective rows of the pixels, computed by all the threads, are reasonably set to enable the numbers of the pixels in the respective rows to be equal, so that the computing amount can be equalized between the respective threads to the utmost degree, parallel computing of the respective threads is facilitated, and accordingly, parallel computing for image filtering is accelerated.

Optionally, the image filtering method provided by the present invention may also be the following: when filtering processing is performed on a 2-dimensional image and the radius of the neighborhood range for filtering processing is 1, in the computing direction determination step, the number of the determined computing directions is 4, and in the image filtering result obtaining step, the filtering results of the 4 determined computing directions, obtained by the respective directions filtering computing step, are accumulated according to each pixel of said image to obtain the image filtering result of said image.

Thus, parallel filtering processing of the 2-dimensional image by the multi-core processor may reduce not only repeated computations in the current parallel computing but also the computing amount, thereby greatly accelerating parallel computing for 2-dimensional image filtering and improving the speed and the practicability of 2-dimensional image filtering processing.

Optionally, the image filtering method provided by the present invention may also be the following: when filtering processing is performed on a 3-dimensional image and the radius of the neighborhood range for filtering processing is 1, in the computing direction determination step, the number of the determined computing directions is 13, and in the image filtering result obtaining step, the filtering results of the 13 determined computing directions, obtained by the respective directions filtering computing step, are accumulated according to each pixel of said image to obtain the image filtering result of said image.

Thus, parallel filtering processing of the 3-dimensional image by the multi-core processor may reduce not only repeated computations in the current parallel computing but also the computing amount, thereby greatly accelerating parallel computing for 3-dimensional image filtering and improving the speed and the practicability of 3-dimensional image filtering processing.

Optionally, the image filtering method provided by the present invention may also be the following: when filtering processing is performed on a 3-dimensional image and the radius of the neighborhood range for filtering processing is r, after a plurality of computing directions are determined by the computing direction determination step, the following processing is performed: (1) reading the initiative $2r+1$ 2-dimensional images in a plurality of 2-dimensional images constituting the 3-dimensional image into a shared memory of the multi-core processor from a global memory, and performing the respective directions filtering computing step and the image filtering result obtaining step on the $2r+1$ 2-dimensional images; (2) writing the filtering results of the respective pixels of the first $r+1$ 2-dimensional images in the $2r+1$ 2-dimensional images into the global memory from the shared memory; (3) reading the follow-up $r+1$ 2-dimensional images in the 2-dimensional images constituting the 3-dimensional image into the shared memory from the global memory, and performing the respective directions filtering computing step and the image filtering result obtaining step on $2r+1$ 2-dimensional images consisted of both the follow-up $r+1$ 2-dimensional images and $r$ 2-dimensional images not written into the global memory from the shared memory; and (4) repeating (2) and (3) until the image filtering results of all the 2-dimensional images constituting the 3-dimensional image are written into the global memory from the shared memory, and taking the image filtering results of all the 2-dimensional images written into the global memory as the image filtering result of the 3-dimensional image.

Generally, the global memory does not have a cache and is relatively slow in reading and writing while the shared memory of the multi-core processor has a cache and is relatively quick in reading and writing. By virtue of the above processing, the cache mechanism of the shared memory is fully utilized to reduce the number of times of the access of the global memory and greatly shorten the access time of the memory of the processor, and accordingly, the speed and the practicability of image filtering processing are improved.

In order to achieve the above purpose, the present invention further provides a CT system which scans an object to be scanned via X-rays and outputs the CT image of the object to be scanned. The CT system is characterized in that it comprises a CT scanner, a CT scanner, a CT image reconstruction apparatus and a CT image output apparatus, wherein the CT scanner is configured to scan an object to be scanned via X-rays so as to obtain a projection image of the object to be scanned; the CT image reconstruction apparatus comprises a multi-core processor and is configured to reconstruct the CT image, wherein the parallel filtering processing of the image by use of the multi-core processor to reconstruct the CT image comprises: determining a plurality of computing directions for filtering processing according to the number of the dimension of the image and the predetermined neighborhood range of filtering processing, according to each of the determined computing directions; for one row of pixels in said image, by taking each pixel in the row as an object pixel, performing by each thread in a plurality of threads predetermined filtering computing between the object pixel and the respective neighborhood pixels of the object pixel in the computing direction; saving the filtering computing results as the filtering results of the object pixels and the respective neighborhood pixels in a cumulative manner; accumulating the filtering results of all the determined computing directions according to each pixel of said image to obtain the image filtering result of said image, wherein the neighborhood pixels are pixels located within the neighborhood range of the object pixel; and the CT image output apparatus is configured to output the CT image reconstructed by the CT image reconstruction apparatus.

According to the CT system provided by the present invention, image filtering processing by use of parallel computing in CT image reconstruction may reduce not only repeated computations in the current parallel computing but also the computing amount, thereby greatly accelerating both parallel computing for image filtering and image filtering processing, and enabling image filtering to be better applied to large-scale data computations such as medical image processing represented by the CT system.

Optionally, the image filtering method provided by the present invention may also be the following: the multi-core processor of the CT image reconstruction apparatus is a GPU.

The high-performance numeric operation capability of the GPU has developed rapidly in recent years, and thus the GPU is particularly suitable for operations with high degree of parallelism and large computing amount. Parallel realization of filtering processing during CT image reconstruction by the GPU may improve the image filtering processing speed to a greater extent.

The present invention is not limited to the image filtering method and the CT system described above and may be achieved by other ways. For example, the purpose of the present invention can also be achieved by the CT image reconstruction method and the CT image generation method comprising the image filtering method described above. In addition, the purpose of the present invention can also be achieved by executing processing corresponding to the respective steps of the above image filtering method via an image filtering apparatus or a CT image reconstruction apparatus based on a software module or hardware architecture.

DETAILED DESCRIPTION

Figure 1:
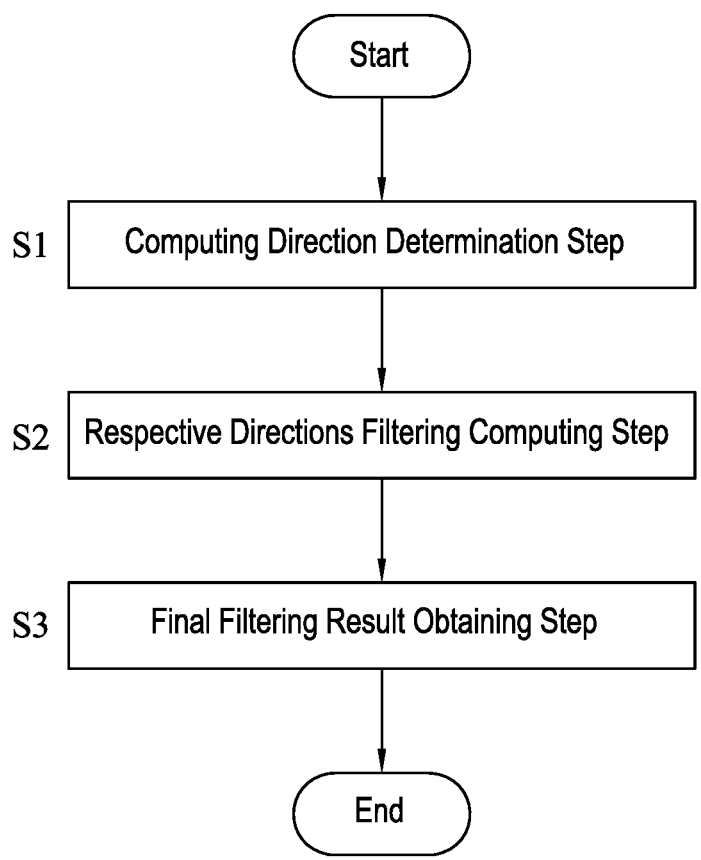
FIG. 1 is a flow chart showing the image filtering method of the present invention.

In order to comprehend the present invention, image filtering processing is generally illustrated at first.

There are many image filtering methods, which can be mainly divided into two types, frequency-domain methods and spatial-domain methods. The spatial-domain methods are direct filtering method and directly operate the image gray level during image processing. The present invention relates to a parallel computing method for spatial filtering. Image filtering conducts computation by use of the pixel values of computation position pixels (center pixels and object pixels) and the respective pixel values within the neighborhood according to a filtering formula to finally obtain the filtering results of the computation position pixels. Here, neighborhood is a technical term in the field, also known as filter kernel, refers to an area which contributes to (influences) filtering of the computation position pixels (center pixels and object pixels), for example, a neighborhood range with the radius of r. Pixels located within the neighborhood range of the computation position pixels (center pixels and object pixels) are known as neighborhood pixels.

In image filtering processing, the filtering formulas of different filters are different. For example, in iterative operation of a CT image, regularization computation performs subtraction on the pixel values of neighborhood pixels and computation position pixels and then performs follow-up operations by use of the difference value. In the follow-up illustrations, by taking the subtraction operation of the pixel values of the neighborhood pixels and the computation position pixels as the basic operation, the parallel processing method is introduced by examples. However, the present invention may also be applied to other filtering kernels and is not limited to subtraction.

Filtering computing is to compute the aggregate influence on the center pixels from each pixel in the neighborhood. The influence extent of each pixel in the neighborhood may be controlled by the weight value. In general image filtering, the influence weight on the computation position pixels from the neighborhood pixels mainly depends on the positions of each neighborhood pixel relative to the center pixels or the distance between each neighborhood pixel and the center pixels. Generally, the influence on a pixel b from a pixel a in the neighborhood is the same as the influence on the pixel a from the pixel b. During traditional parallel image filtering processing, filtering computing of each pixel point in the image is given to be accomplished by each thread as a basic computing element. At the moment, when the pixel a becomes a computation position pixel (center pixel), the influence on the pixel a from the pixel b is computed in the image filtering result. After that, when the pixel b becomes a computation position pixel (center pixel), the influence on the pixel b from the pixel a is computed in the image filtering result. As mentioned above, the influence on the pixel b from the pixel a is generally the same as the influence on the pixel a from the pixel b, so lots of repeated computations are performed during traditional parallel image filtering processing, which leads to unnecessary increase of both computing amount and computation time.

On the other hand, during parallel computing by use of the multi-core processor, each thread processes its own task, and the respective threads can conduct computation in a parallel manner. All the threads are divided into a series of thread blocks, the threads in the same thread blocks can access their shared memory which has a cache inside, and the shared memory is relatively quick in writing and reading but limited in memory size. Therefore, during general parallel computing, a thread block reads part of input data into the shared memory from a global memory (such as a video memory) at first, then computes in the shared memory and finally copies the result back into the global memory from the shared memory so as to make use of the advantage of high reading and writing speed of the shared memory. During traditional parallel image filtering processing, filtering computing of each pixel point in the image is given to be accomplished by each thread as a basic computing element. At the moment, for example, during processing of pixels in a certain tile of image (such as a first tile of image) in a 3-dimensional image, filtering computing by use of neighborhood pixels in a second tile of image is required, so the second tile of image needs to be read from the global memory. Afterwards, during processing of the second tile of image, the second tile of image also needs to be read from the global memory. And also, during later processing of a third tile of image, filtering computing by use of neighborhood pixels in the second tile of image is required, so the second tile of image needs to be re-read from the global memory. That is to say, when the neighborhood radius r is 1, the second tile of image needs to be read for 3 times. Therefore, lots of repeated accesses of the global memory are caused during traditional parallel image filtering processing, which leads to unnecessary increase of both the number of times of the access and access time.

Aiming at the current situation mentioned above, the present invention provides an image filtering method which filters an image in a parallel manner by use of a multi-core processor represented by a GPU. FIG. 1 is a flow chart showing the image filtering method of the present invention. As shown in FIG. 1, the image filtering method comprises a computing direction determination step S1, an the respective directions filtering computing step S2 and an image filtering result obtaining step S3.

Figure 2A:
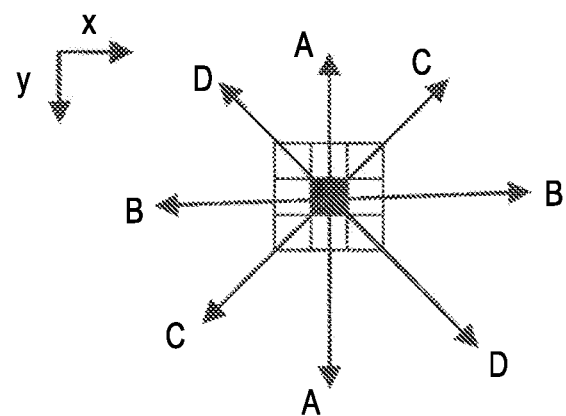
FIGS. 2A and 2B are schematic drawings showing computing directions of 2-dimensional and 3-dimensional image filtering of the present invention.
Figure 2B:
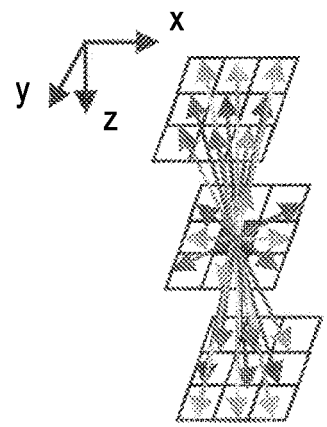

In the computing direction determination step S1, a plurality of computing directions for filtering processing are determined according to the number of the dimension of the image and the predetermined neighborhood range of filtering processing. Here, the computing direction refers to a direction formed by connection of at least two neighborhood pixels which are mutually symmetric about an object pixel. During filtering computing, pixels in the neighborhood are all centrosymmetric about a center pixel (object pixel), for example, an upper right pixel (x+1, y+1) and a lower left pixel (x−1, y−1) are symmetric about the center pixel (x, y), then the upper right pixel and the lower left pixel are both located on a 45-degree straight line passing through the center pixel, and such straight line is known as a computing direction. The pixels in the neighborhood can be divided to be in different computing directions according to the number of the dimension of the image and the difference of neighborhood sizes. The FIGS. 2A and 2B are schematic drawings showing computing directions of 2-dimensional and 3-dimensional image filtering. As shown in FIG. 2A, as a 2-dimensional image, when the neighborhood radius is 1 (i.e. the neighborhood range is 3*3 pixels), there are 8 neighborhood pixels in total and A, B, C and D four computing directions in total indicated by arrows. As shown in FIG. 2B, as a 3-dimensional image, when the neighborhood radius is 1 (i.e. the neighborhood range is 3*3*3 pixels), there are 26 neighborhood pixels in total and 13 computing directions in total indicated by the arrows.

In the respective directions filtering computing step S2, the following processing is performed according to each of the determined computing directions: for one row of pixels in the image, by taking each pixel in the row as an object pixel, each thread in a plurality of threads conducts predetermined filtering computing between the object pixel and the respective neighborhood pixels of the object pixel in the computing direction, and the filtering computing results are saved as the filtering results of the object pixels and the respective neighborhood pixels in a cumulative manner. Here, filtering computing is illustrated on the basis of subtraction (for example), the formula is shown as below, and the filtering computing may be applied to regular term computing for iterative reconstruction of a CT image.

$$\mu'_{x,y,z} = \sum_{-mx<r<mx} \sum_{-my<s<my} \sum_{-mz<t<mz} N_{r,s,t} \Phi(\mu_{x,y,z} - \mu_{x+r,y+s,z+t})$$

Where x, y and z are coordinate values of filtering points (pixels) in the image; $\mu$ is the pixel's gray value before filtering; $\mu'$ is the pixel's gray value after filtering; mx, my and mz are the neighborhood radii of filter kernels in x, y and z directions; the size of neighborhood applied to filtering computing is 2*m+1; and the center point of the neighborhood is a point (pixel) to be filtered. When mz=0, 3-dimensional filtering is converted into 2-dimensional filtering. In addition, $N_{r,s,t}$ is the weights of the respective points within the neighborhood range, and $\Phi$ is a filter function which usually has certain symmetry.

In the image filtering result obtaining step S3, the filtering results of the respective determined computing directions, obtained by the respective directions filtering computing step S2, are accumulated according to each pixel of the image to obtain the image filtering result of the image.

Several embodiments of the image filtering method provided by the present invention are specifically illustrated below.

Firstly, an example of filtering processing of a 2-dimensional image is illustrated. When filtering processing is performed on the 2-dimensional image and the radius r of the neighborhood range for filtering processing is 1, as mentioned above, the number of the computing directions determined in the computing direction determination step S1 is 4.

Then, input images (2-dimensional images) are read into a GPU global memory, and output images in the global memory are initialized to be zero. Afterwards, task allocation is performed. The FIGS. 3A-3D are schematic drawings showing the task allocation of threads in the respective computing directions for the 2-dimensional-image. Here, supposing that the size of the 2-dimensional image is x*Y (such as 512*512), the input images may be divided into several rectangular areas on an XY plane, the 2-dimensional images corresponding to each rectangular area are processed by a thread block. Supposing that the thread block contains 32 threads, the original images may be divided into 256 rectangular areas with the sizes of 32*32 on the XY plan, each thread block processes the images (with the sizes of 32*32) corresponding to one of the rectangular areas, and the sizes of the rectangular areas may be adjusted according to the number of processors in the GPU to guarantee the parallel efficiency. The respective thread blocks execute in a parallel manner. All filtering computations in one of the 4 computing directions are processed in a parallel manner, and memory reading and writing are performed in the shared memory. Each thread computes one row of the images in the computing direction, sequentially reads two pixels within the neighborhood range of the row, conducts computations according to a filtering formula and accumulates the computing result into the results of the two pixels corresponding to the output images.

Figure 3A:
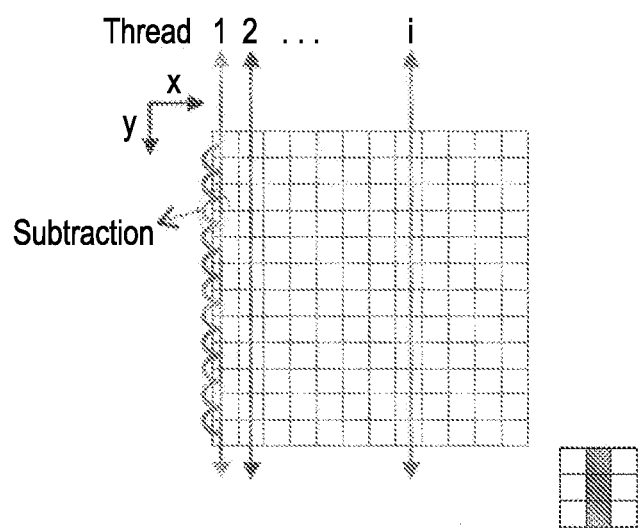
FIGS. 3A-3E are schematic drawings showing the task allocation of threads in all computing directions of the present invention.

As shown in FIG. 3A, during computation of the direction (i.e. the direction in FIG. 2A) indicated by FIG. 3A, the respective threads in one thread block are indicated by straight lines with arrows, 1 row in the y direction is computed in a parallel manner, the thread 1 computes the 1st row, the thread 2 computes the 2nd row, and the thread 32 processes the 32nd row to complete computing of the 2-dimensional images in the A direction. Wherein each thread aims at one row of pixels (referring to one row in y direction here) in the images, respectively, for example, the pixels from the first to the last of the row sequentially serve as the object pixel, filtering computing is performed between the object pixel and the respective neighborhood pixels of the object pixel in the computing direction (A direction), and the filtering computing results are saved as the filtering results of the object pixels and the respective neighborhood pixels in a cumulative manner, respectively. For example, the pixel's gray value after filtering μ' may be computed via the formula below:

$$\mu'_{x,y} += N_{0,1}\Phi(\mu_{x,y}-\mu_{x,y+1})$$

$$\mu'_{x,y+1} += N_{0,-1}\Phi(-(\mu_{x,y}-\mu_{x,y+1}))$$

Figure 3B:
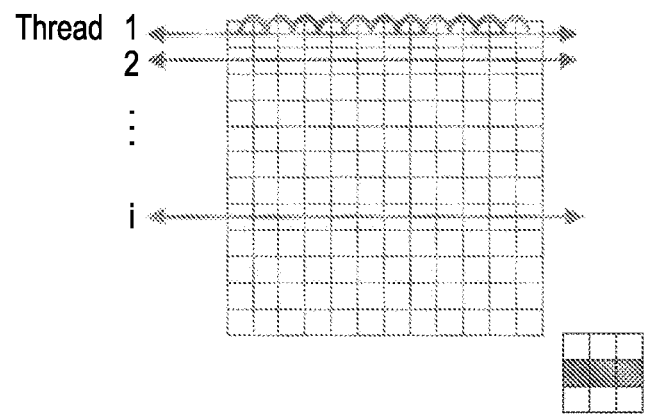

As shown in the FIG. 3B, during computation of the direction (i.e. B direction in FIG. 2A) indicated in FIG. 3B, each thread computes one row in the x direction in a parallel manner, and the parallel method is similar to that of the A direction. For example, the pixel's gray value after filtering μ' may be computed via the formula below:

$$\mu'_{x,y} += N_{1,0}\Phi(\mu_{x,y}-\mu_{x+1,y})$$

$$\mu'_{x+1,y} += N_{-1,0}\Phi(-(\mu_{x,y}-\mu_{x+1,y}))$$

Figure 3C:
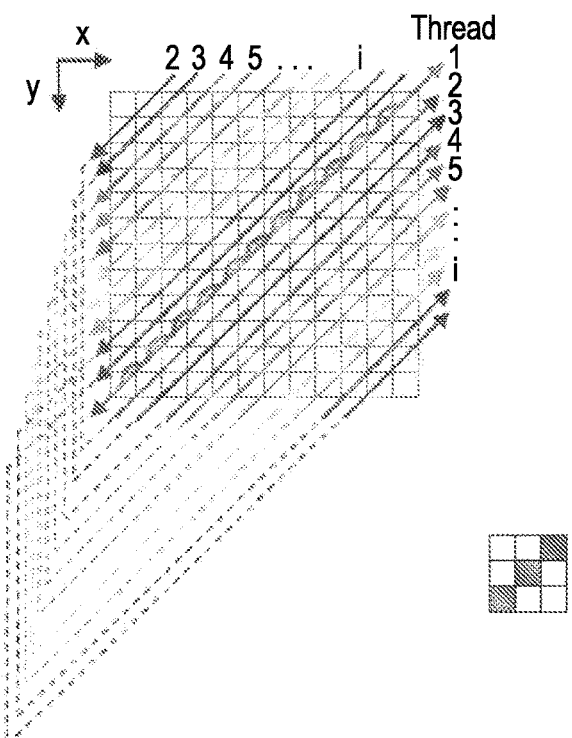

As shown in FIG. 3C, during computation of the direction (i.e. C direction in FIG. 2A) indicated in FIG. 3C, each thread computes filtering of a straight line in a 45-degree direction as shown by straight lines with arrows in a parallel manner. A thread 1 computes the respective points on a connecting line from a point (32, 1) to a point (1, 32). A thread 2 computes the respective points on a connecting line from a point (32, 2) to a point (2, 32) and the respective points on a connecting line from a point (1, 2) to a point (2, 1). The difference from the A direction and the B direction lies in that due to rectangular images, the two straight lines processed by the thread 2 are discontinuous, and in fact, the second straight line can be regarded as the extension of the first straight line within the rectangular range. That is to say, under the circumstance that the computing directions inclined relative to the pixel arrangement directions (here referring to the A direction and the B direction) of the image are determined in the computing direction determination step S1, in the respective directions filtering computing step S2, during processing according to the inclined directions (such as the C direction), the numbers of the pixels in the respective rows, computed by the respective threads, are equal. For example, the pixel's gray value after filtering μ' can be computed via the formula below:

$$\mu'_{x,y} += N_{-1,1}\Phi(\mu_{x,y}-\mu_{x-1,y+1})$$

$$\mu'_{x-1,y+1} += N_{1,-1}\Phi(-(\mu_{x,y}-\mu_{x-1,y+1}))$$

Figure 3D:
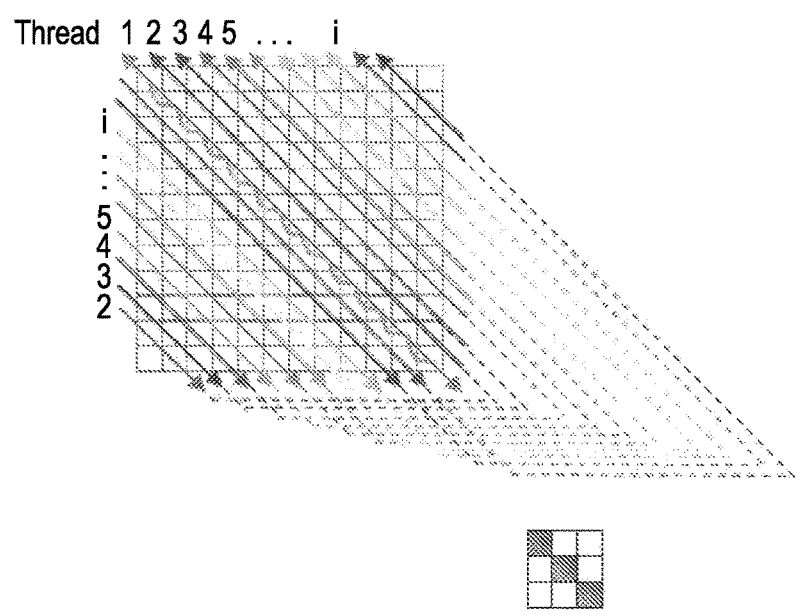

As shown in FIG. 3D, the computing of the direction (i.e. D direction in FIG. 2A) indicated in FIG. 3D is similar to that of the C direction, each thread computes the filtering on a straight line whose scope is in a 135-degree direction in a parallel manner. For example, the pixel's gray value after filtering μ' can be computed via the formula below:

$$\mu'_{x,y} += N_{1,1}\Phi(\mu_{x,y}-\mu_{x+1,y+1})$$

$$\mu'_{x+1,y+1} += N_{-1,-1}\Phi(-(\mu_{x,y}-\mu_{x+1,y+1}))$$

During the computing from the A direction to the D direction, preferably, the respective threads in the thread blocks perform filtering computing in a mutually parallel manner. For example, the respective threads take the pixels (such as the nth pixels) of the same order from the initiative pixels in the pixels of the respective rows computed by themselves as the object pixels. As such, under the circumstance that the numbers of the pixels in the respective rows are equal, the respective threads can perform filtering computing in a mutually parallel manner.

By the above computations, the filtering results of the 4 computing directions are computed by the respective directions filtering computing step S2. Then, in the image filtering result obtaining step S3, the filtering results of the 4 determined computing directions are accumulated according to each pixel of the 2-dimensional image to obtain the image filtering result of the 2-dimensional image. Finally, all the image filtering results of all the thread blocks are written into the global memory from the shared memory to serve as the image filtering result of the 2-dimensional image. Here, each thread block processes one rectangular area in the 2-dimensional image data by the above method, and the respective thread blocks execute in a parallel manner until all image data are processed.

Secondly, an example of filtering processing of a 3-dimensional image is illustrated. When filtering processing is performed on the 3-dimensional image and the radius r of the neighborhood range for filtering processing is 1, as mentioned above, the number of the computing directions determined in the computing direction determination step S1 is 13. Here, illustration is made still by reference to the FIGS. 3A to 3D and FIG. 3E, FIG. 4, FIG. 5A and FIG. 5B additionally. Here supposing that the size of the 3-dimensional image is X*Y*Z (such as 512*512*512), the 3-dimensional image can be regarded as Z X*Y 2-dimensional image tiles.

Then, input images (3-dimensional images) are read into a GPU global memory, and output images in the global memory are initialized to be zero. Afterwards, task allocation is performed. The input images may be divided into several rectangular areas on an XY plane, and the 3-dimensional images corresponding to each rectangular area are processed by a thread block. Supposing that the thread block contains 32 threads, the original images may be divided into 256 rectangular areas with the sizes of 32*32 on the XY plan, and each thread block processes the images (with the sizes of 32*32*Z) corresponding to one of the rectangular areas. The same as the 2-dimensional images, the sizes of the rectangular areas may be adjusted according to the number of processors in the GPU to guarantee the parallel efficiency. The respective thread blocks execute in a parallel manner.

Figure 4:
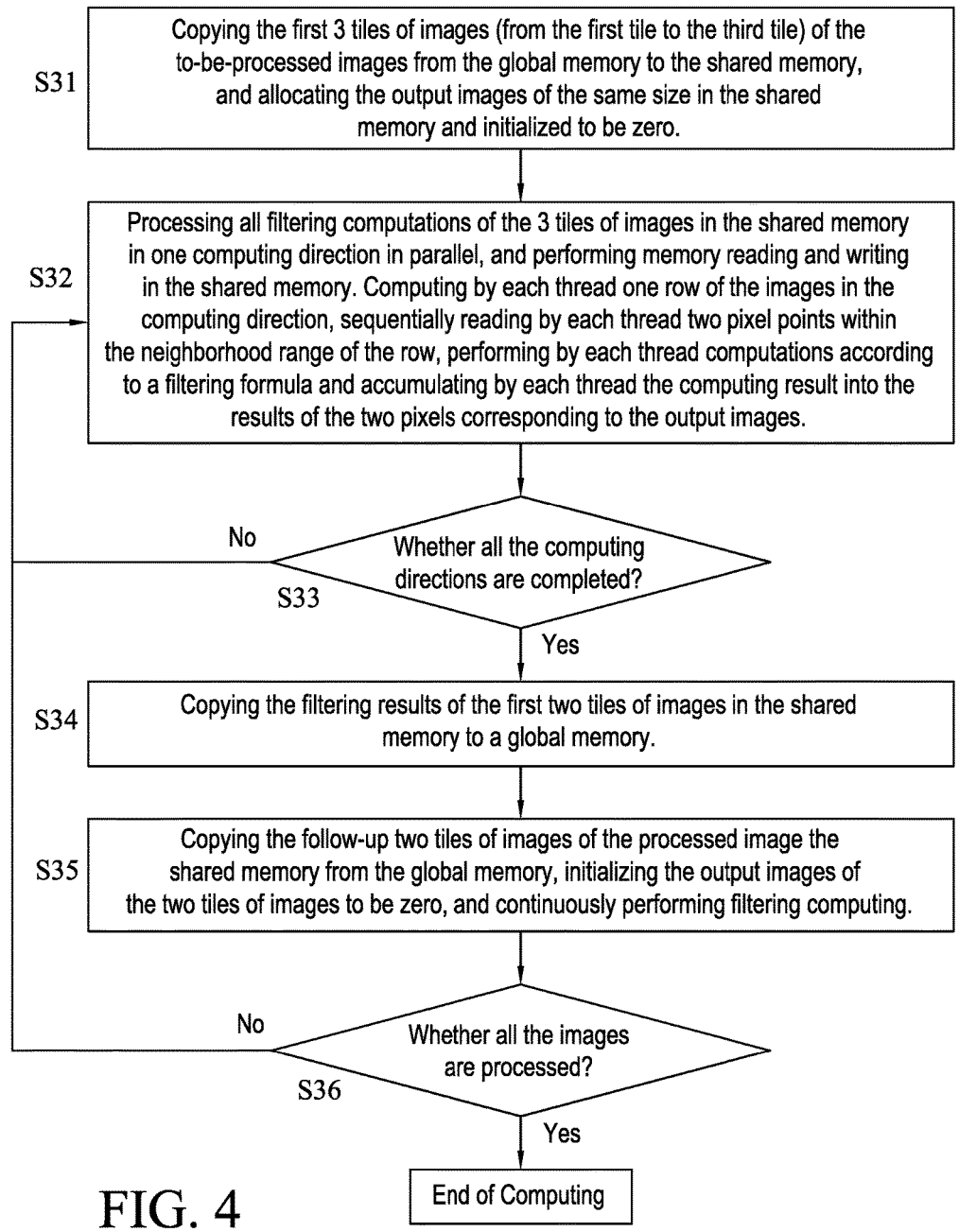
FIG. 4 is a schematic drawing showing the parallel processing procedure of a thread block for a 3-dimensional image of the present invention.
Figure 5A:
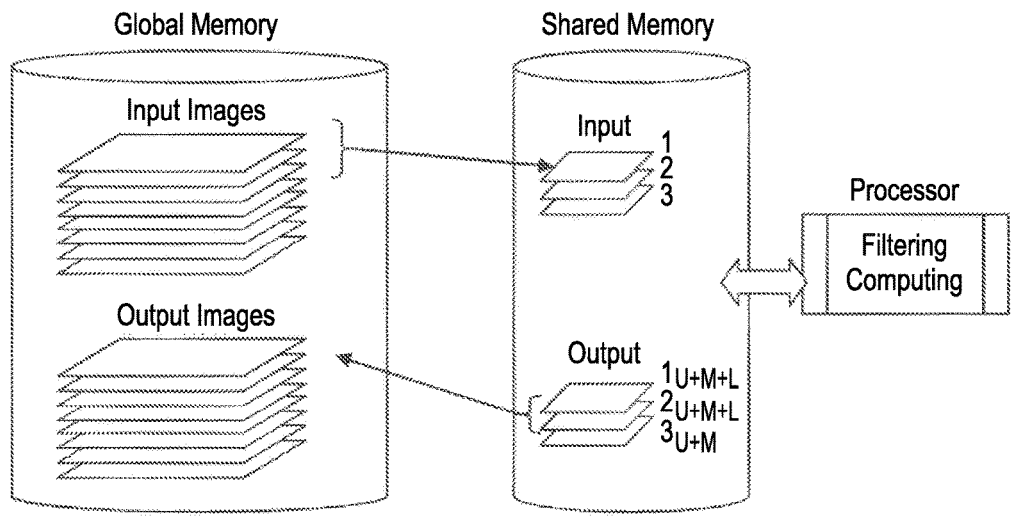
FIGS. 5A and 5B are schematic drawings showing memory management for 3-dimensional image filtering of the present invention.
Figure 5B:
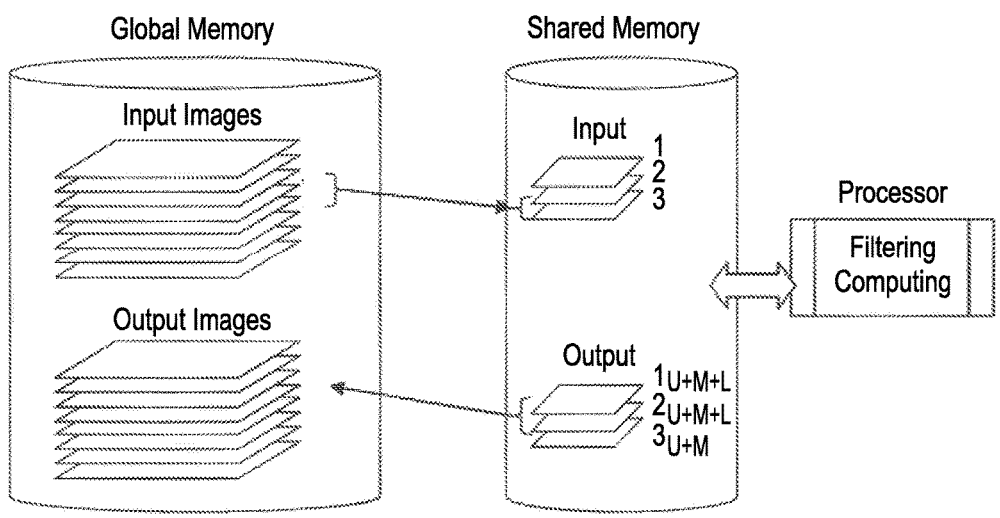

FIG. 4 is a schematic drawing showing the parallel processing procedure of a thread block for a 3-dimensional image of the present invention. The FIGS. 5A and 5B are schematic drawings showing memory management for 3-dimensional image filtering of the present invention. In the FIGS. 5A and 5B, the subscript U represents contribution of the previous tile of image in the 2-dimensional images constituting the 3-dimensional image, M represents contribution of an intermediate image, L represents contribution of the next tile of image, and the output is U+M+L. As shown in the FIGS. 4, 5A and 5B, in a step S31, the initiative 2r+1 2-dimensional images in a plurality of 2-dimensional images constituting the 3-dimensional image are read into a shared memory (shared storage) of the multi-core processor from a global memory, and the respective directions filtering computing step S2 and the image filtering result obtaining step S3 are performed on the 2r+1 2-dimensional images. Here, r is 1, so the first 3 tiles of images (from the first tile to the third tile) of the to-be-processed images are copied from the global memory to the shared memory. The part of images are input images to be processed by the threads, and output images of the same sizes and with the initial value of zero are allocated in the shared memory. In a step S32, all filtering computations in one of the 13 computing directions are processed in a parallel manner, and memory reading and writing are performed in the shared memory. Each thread computes one row of the images in the computing direction, sequentially reads two pixel points within the neighborhood range of the row, conducts computations according to a filtering formula and accumulates the computing result into the results of the two pixel points corresponding to the output images.

In the above 13 computing directions, computations in the 2-dimensional computing direction are the same as those of the 2-dimensional images mentioned above. For example, during computation in the A direction indicated by FIG. 3A, particular operations of the thread 1 are as follows: firstly, reading the first two pixels of the first row, namely two pixels with the y coordinates of 1 and 2; performing subtraction on the values of the two pixels, and substituting into the above filtering formula; computing $N_{0,1,0}\Phi(\mu_{1,1,1}-\mu_{1,2,1})$, and accumulating the result into $\mu'_{1,1,1}$; computing $N_{0,-1,0}\Phi(\mu_{1,2,1}-\mu_{1,1,1})$, and accumulating the result into $\mu'_{1,2,1}$; then reading a point with the y coordinate of 3; performing subtraction on $\mu_{1,2,1}$ and $\mu_{1,3,1}$; computing $N_{0,1,0}\Phi(\mu_{1,2,1}-\mu_{1,3,1})$, and accumulating the result into $\mu_{1,2,1}$ and $\mu_{1,3,1}$; computing $N_{0,1,0}\Phi\mu'_{1,2,1}$; computing $N_{0,-1,0}\Phi(\mu_{1,2,1}-\mu_{1,3,1})$, and accumulating the result into $\mu'_{1,3,1}$; and so on, until computations of the whole row are finished. The computations of other 2-dimensional directions are not repeated here.

Figure 3E:
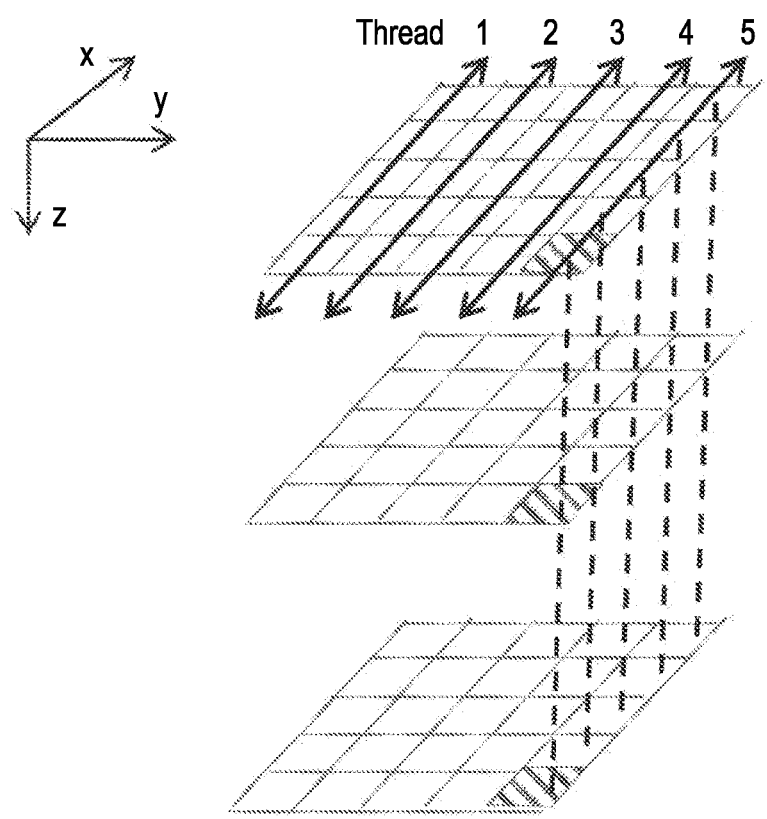

The parallel method in a 3-dimensional computing direction may be obtained on the analogy of the parallel method of the 2-dimensional computing direction, their ideas are the same but only the straight line direction to be computed is changed from 2-dimensional to 3-dimensional. Here, a computing direction of the 3-dimensional directions is taken for illustration. FIG. 3E is a schematic drawing showing the task allocation of threads in a 3-dimensional computing direction (Z direction) for a 3-dimensional image of the present invention. As shown in FIG. 3E, each thread computes the row indicated by the straight lines with arrows, for example, the pixels from the first to the last of the row sequentially serve as the object pixel, filtering computing (such as subtraction of the pixel values) is performed between the object pixel and the respective neighborhood pixels of the object pixel in the Z direction, and the filtering computing results are saved as the filtering results of the object pixels and the respective neighborhood pixels in a cumulative manner.

In a step S33, determining whether computations of all the computing directions are completed. If no, returning to step S32, and if yes, after the computations of the 13 computing directions are all completed, the computations of mutual filtering contributions of the 2r+1 (here referring to 3) tiles of images in the shared memory are completed. Wherein filtering computations of the first r+1 tiles (here referring to the 1st tile and the 2nd tile) are all completed, and the contributions of the 4th tile of image to the rest r tiles (here referring to the 3rd tile) of image need to be computed, so filtering computing of the 3rd tile of image has not been completed. At the moment, in a step S34, the filtering results $(1_{M+L}, 2_{U+M+L})$ of the respective pixels of the first r+1 (the 1st tile and the 2nd tile) 2-dimensional images in the read 2r+1 (3 tiles) 2-dimensional images are written into the global memory from the shared memory, and intermediate result $(3_{U+M})$ of the 3rd tile of image still remains in the shared memory for later computations.

Then, in a step S35, the follow-up r+1 (here referring to the 4th tile and the 5th tile) 2-dimensional images in the 2-dimensional images constituting the 3-dimensional image are read into the shared memory from the global memory, and the output images of the two images are initialized to be zero. After that, the respective directions filtering computing step S2 and the image filtering result obtaining step S3 are performed on 2r+1 2-dimensional images (here referring to the 3th tile to the 5th tile) consisted of both the follow-up r+1 2-dimensional images and r 2-dimensional images not written into the global memory from the shared memory previously specifically like the steps S32 to S34, not repeated here. In a step S36, determining whether all processing of the 3-dimensional image are completed or not, if yes, returning to the step S32, and the above processing is repeated until the z 2-dimensional images are all processed, that is, the image filtering results of all the 2-dimensional images constituting the 3-dimensional image are written into the global memory from the shared memory.

Here, each thread block processes one 3-dimensional image in the 3-dimensional image data, and the respective thread blocks execute in a parallel manner until all the image data are processed. Finally, computations are finished, and all the image filtering results written into the global memory serve as the image filtering result of the 3-dimensional image.

Figure 6:
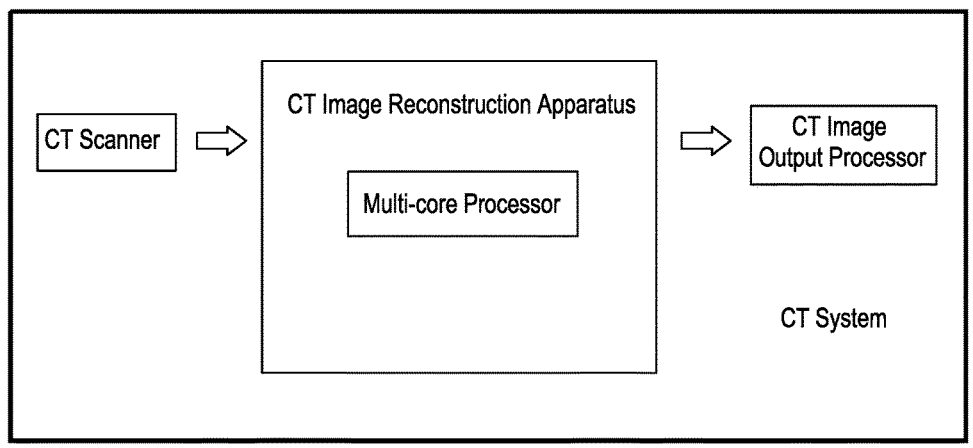
FIG. 6 is a system diagram of the CT system of the present invention.

Next, the CT system provided by the present invention is illustrated with reference to FIG. 6. FIG. 6 is a system diagram of the CT system of the present invention. As shown in FIG. 6, the CT system scans the object to be scanned via X-rays, outputs the CT image of the object to be scanned and comprises a CT scanner, a CT image reconstruction apparatus and a CT image output apparatus.

The CT scanner is configured to scan the object to be scanned via X-rays so as to obtain a projection image of the object to be scanned. Particularly, single-pinacoid rays penetrate the object to be scanned, and according to the different ray absorption rates and the different transmission rates of the respective parts of the object to be scanned, the projection image of the object to be scanned is obtained.

The CT image reconstruction apparatus comprises a multi-core processor and is configured to reconstruct the CT image from the projection image. In order to reconstruct the CT image, the CT image reconstruction apparatus filters the image in a parallel manner by use of the multi-core processor via the above method.

The CT image output apparatus is configured to output the CT image reconstructed by the CT image reconstruction apparatus. Here, the CT image output apparatus is a CT image display apparatus for example, and the CT image output apparatus is implemented by display device such as a liquid crystal display or a touch screen and the like and is configured to display the CT image reconstructed by the CT image reconstruction apparatus. In addition, the CT image output apparatus may also be printing device and the like to print the CT image reconstructed by the CT image reconstruction apparatus. Of course, the CT image output apparatus only needs to output the CT image, and therefore, also can be a universal I/O interface.

According to the above implementations of the present invention, filtering computing of each pixel point is divided into several parts, all the threads simultaneously complete one of the parts every time until all the parts are completed, and the results are accumulated to obtain the final result. That is, image filtering computing is divided according to the computing directions, all the threads complete computations of all the pixels on the image in one computing direction every time in a parallel manner until the computations of all the computing directions are completed. As mentioned above, the influence on a pixel b from a pixel a within neighborhood should be the same as that on the pixel a from the pixel b. By use of this, the computing results of the pixels a and b can be applied to filtering of not only the pixel a but also the pixel b via computations according to directions, so repeated computations in the traditional parallel method are avoided.

Besides, according to the above implementations of the present invention, repeated reading and writing accesses of the global memory are prevented. All reading and writing in the computations are carried out in the shared memory to make the best use of the cache. The access of the global memory only requires one-time reading-in of input image data and one-time writing-out of output image data. However, in the traditional parallel method, each thread is in charge of processing all filtering computations of a point, the 2rd tile of image is required during processing of the 1st tile of image and also required during processing of the 3rd tile of image, and needs to be read 3 times. Therefore, the number of times for reading images in the global memory is greatly reduced and the image processing speed is greatly improved.

In the above implementations, the subtraction operation of the pixel values of the neighborhood pixels and the object pixels is taken as the basic operation to illustrate image filtering computing. However, the image filtering computing which can be adopted by the present invention is not limited thereto. All image filtering computations satisfying the principle that the influence on a pixel b from a pixel a which are neighborhood pixels is the same as that on the pixel a from the pixel b are applicable to the image filtering method of the present invention. The present invention mainly aims at the parallel processing method but not specific image filtering computations.

In the above implementations, that the GPU processor serves as the multi-core processor is taken as an example. But not limited thereto, all multi-core processors with the parallel multi-thread processing capability may be configured to realize the present invention.

The invention claimed is:

1. An image filtering method to filter an image in a parallel manner using a multi-core Computed Tomography (CT) imaging processor, the image filtering method comprising the following steps:
   determining, by said multi-core CT imaging processor, a plurality of computing directions for filtering processing according to a number of dimensions of an image and a predetermined neighborhood range of said filtering processing;
   computing in parallel by each of a plurality of processing threads of said multi-core CT imaging processor, respective directions filtering for each of the plurality of processing threads of said multi-core CT imaging processor, wherein the following processing is performed by said multi-core CT imaging processor according to each of the determined computing directions
      for one row of pixels in the image, by taking each pixel in the row as an object pixel, performing by each said processing thread predetermined filtering computing between an object pixel and respective neighborhood pixels of the object pixel in the computing direction; and
      storing the filtering computing results as filtering results of the object pixels and the respective neighborhood pixels in a cumulative manner,
         wherein the neighborhood pixels are pixels located within the neighborhood range of the object pixel; and
   obtaining, by said multi-core CT imaging processor, an image filtering result by accumulating filtering results of each said determined computing direction for each said respective parallel directions filtering computing step according to each pixel of the image so as to obtain the image filtering result of the image.

2. The image filtering method of claim 1, wherein,
in the computing respective directions filtering step, each thread aims at one row of pixels in the image, respectively, the pixels from a first to a last of the row sequentially serve as the object pixel, filtering computing is performed between the object pixel and the respective neighborhood pixels of the object pixel in the computing direction, and the filtering computing results are saved as the filtering results of the object pixels and the respective neighborhood pixels in a cumulative manner.

3. The image filtering method of claim 1, wherein,
when the computing directions are inclined relative to a pixel arrangement direction of the image as determined in the computing direction determination step, in the respective directions filtering computing step, during processing according to the inclined directions, numbers of the pixels in the respective rows, computed by the respective threads, are equal.

4. The image filtering method of claim 1, wherein,
when filtering processing is performed by said multi-core CT imaging processor on a 2-dimensional image and a radius of the neighborhood range for filtering processing is 1, in the computing direction determination step, a number of the determined computing directions is 4, and in the image filtering result obtaining step, filtering results of the 4 determined computing directions, obtained by the respective directions filtering computing step, are accumulated according to each pixel of the image to obtain the image filtering result of the image.

5. The image filtering method of claim 1, wherein,
when filtering processing is performed by said multi-core CT imaging processor on a 3-dimensional image and a radius of the neighborhood range for filtering processing is 1, in the computing direction determination step, a number of the determined computing directions is 13, and in the image filtering result obtaining step, filtering results of the 13 determined computing directions, obtained by the respective directions filtering computing step, are accumulated according to each pixel of the image to obtain the image filtering result of the image.

6. The image filtering method of claim 1, wherein,
when filtering processing is performed by said multi-core CT imaging processor on a 3-dimensional image and a radius of the neighborhood range for filtering processing is r, after a plurality of computing directions is determined in the computing direction determination step, the following processing is performed:
   (1) reading initial 2r+1 2-dimensional images in a plurality of 2-dimensional images constituting a 3-dimensional image into a shared memory of the multi-core processor from a global memory, and performing the respective directions filtering computing step and the image filtering result obtaining step on the 2r+1 2-dimensional images;
   (2) writing the filtering results of the respective pixels of the first r+1 2-dimensional images in the 2r+1 2-dimensional images read into the global memory from the shared memory;
   (3) reading follow-up r+1 2-dimensional images in the 2-dimensional images constituting the 3-dimensional image into the shared memory from the global memory, and performing the respective directions filtering computing step and the image filtering result obtaining step on 2r+1 2-dimensional images comprising both the follow-up r+1 2-dimensional images and r 2-dimensional images not written into the global memory from the shared memory; and (4) repeating steps (2) and (3) until image filtering results of all the 2-dimensional images constituting the 3-dimensional image are written into the global memory from the shared memory, and taking the image filtering results of all the 2-dimensional images written into the global memory as the image filtering result of the 3-dimensional image.

7. A Computed Tomography system configured to scan an object to be scanned via an X-ray and output a CT image of the object to be scanned, the computed tomography system comprising:

a CT scanner configured to scan an object to be scanned via the X-ray so as to obtain a projection image of the object to be scanned;

a CT image reconstruction apparatus comprising a multi-core processor and configured to reconstruct the CT image from the projection image, wherein the CT image reconstruction apparatus is configured to perform parallel filtering processing of the image by use of the multi-core processor to reconstruct the CT image by determining a plurality of computing directions for filtering processing according to a number of dimensions of the image and a predetermined neighborhood range of filtering processing;

according to each of the determined computing directions, for one row of pixels in the image, by taking each pixel in the row as an object pixel, performing by each thread in a plurality of threads predetermined filtering computing between the object pixel and the respective neighborhood pixels of the object pixel in the computing direction;

saving the filtering computing results as the filtering results of the object pixels and the respective neighborhood pixels in a cumulative manner; and accumulating the filtering results of all the determined computing directions according to each pixel of the image to obtain the image filtering result of the image, wherein the neighborhood pixels are pixels located within the neighborhood range of the object pixel; and a CT image output apparatus configured to output the CT image reconstructed by the CT image reconstruction apparatus.

8. The CT system of claim 7, wherein the multi-core processor of the CT image reconstruction apparatus is a graphics processing unit (GPU).

* * * * *